May 31, 1932.                L. MARX                1,860,895
                         EDUCATIONAL APPARATUS
                        Filed May 2, 1928    2 Sheets-Sheet 1
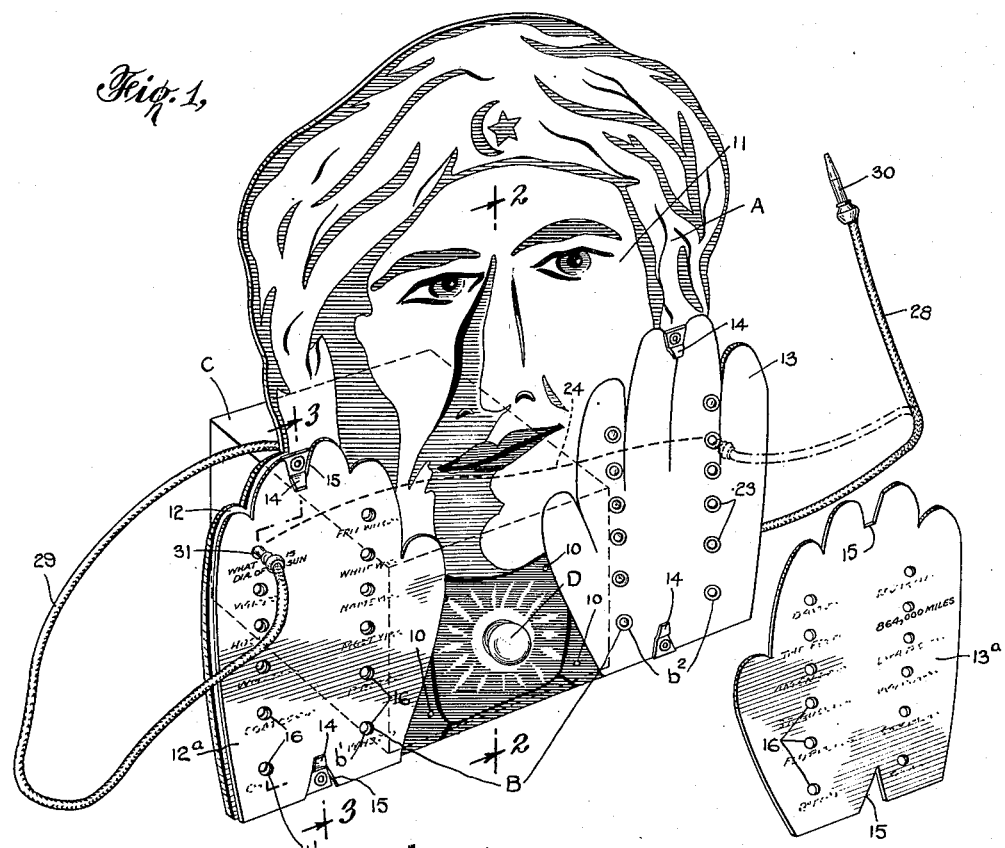
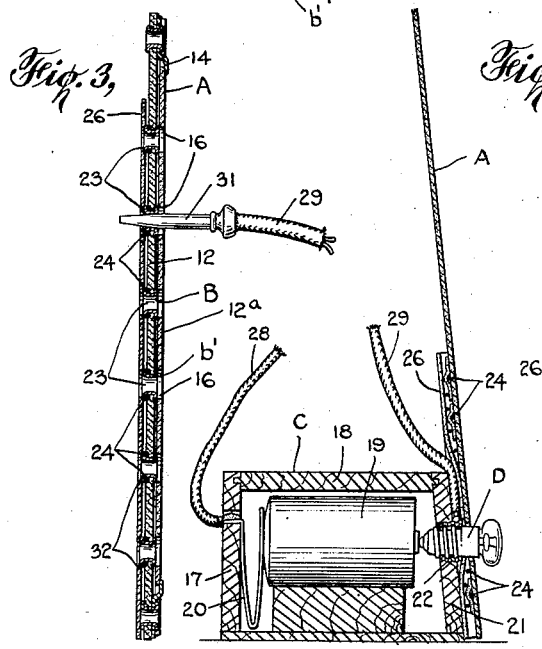
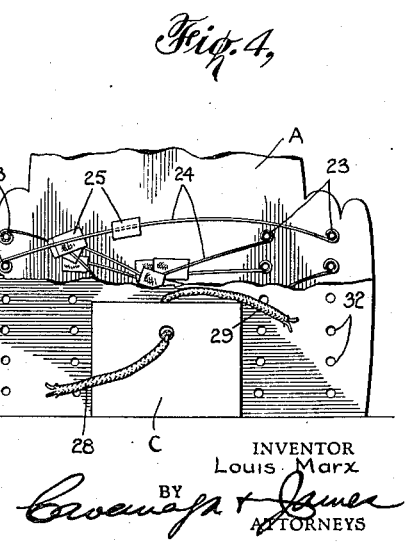
INVENTOR
Louis Marx
BY
ATTORNEYS May 31, 1932. L. MARX 1,860,895
EDUCATIONAL APPARATUS
Filed May 2, 1928 2 Sheets-Sheet 2
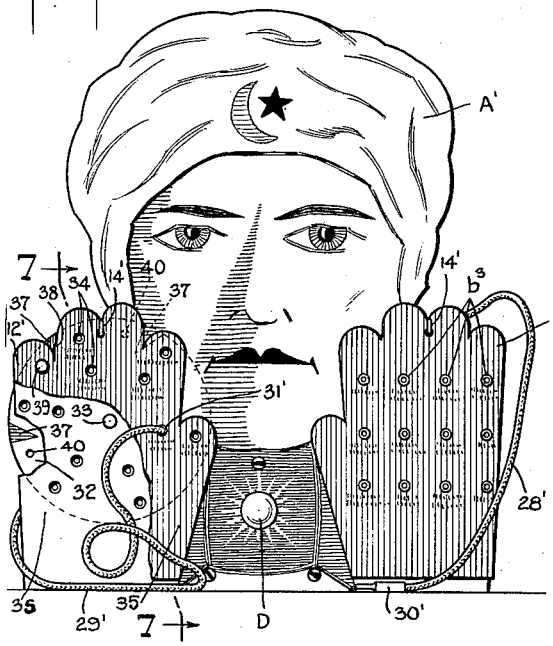
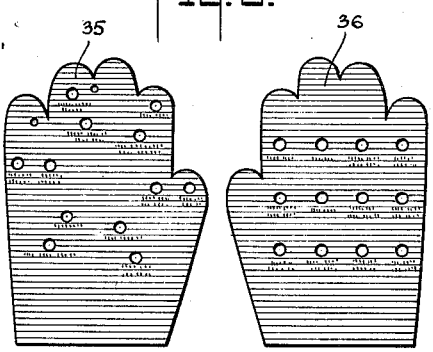
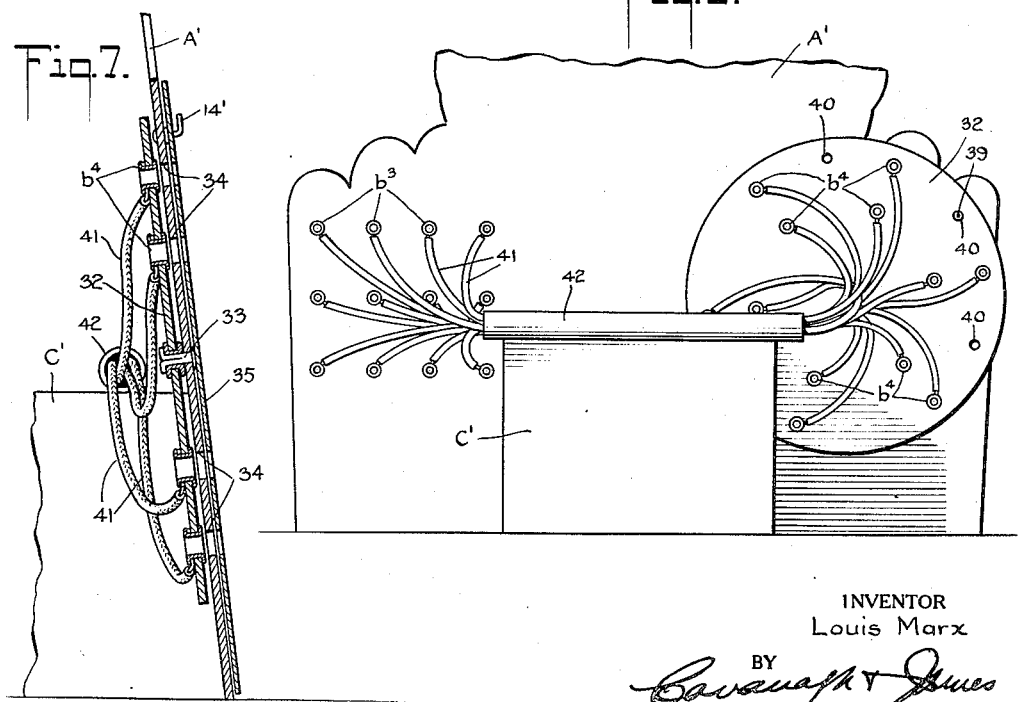
INVENTOR
Louis Marx
BY
ATTORNEYS Patented May 31, 1932

1,860,895

UNITED STATES PATENT OFFICE

LOUIS MARX, OF NEW YORK, N. Y.

EDUCATIONAL APPARATUS

Application filed May 2, 1928. Serial No. 274,385.

This invention relates to an educational apparatus.

The prime object of my present invention is directed to the provision of a novel and improved educational apparatus of the type in which educational or informative data is co-related by the operation of electrical circuits, such apparatus being known generally as electric questioners.

Other prime objects of the invention include the provision of an educational apparatus of the electric questioner type in which a base or plate carrying the electrical circuit apparatus is combined with a stand support which defines a battery casing for holding the battery for the electrical circuit apparatus, the organization of the parts being such as to produce a simplified inter-relation between the mechanical and electrical parts such as to permit the apparatus to be manufactured and sold at a low figure; and the further provision of an electric questioner constructed and designed to attractively simulate a mystic figure and operable to realistically represent the imparting of information by said mystic figure.

To the accomplishment of the foregoing and such other objects as will hereinafter appear, my invention consists in the elements and their relation one to the other, as hereinafter more particularly described and sought to be defined in the claims; reference being had to the accompanying drawings which show the preferred embodiments of my invention, and in which:

Fig. 1 is a perspective view of the educational apparatus of my present invention;

Fig. 2 is a fragmentary elevational view thereof taken in cross-section in the plane of the line 2—2, Fig. 1;

Fig. 3 is a view of a detail taken in cross-section on an enlarged scale in the plane of the line 3—3, Fig. 1;

Fig. 4 is a rear end elevational view thereof with parts broken away;

Fig. 5 is a front elevational view of a modified form of the invention;

Fig. 6 is a face view of question and answer cards used with the modified form of the invention shown in Fig. 5;

Fig. 7 is an enlarged cross-sectional view thereof taken in the plane of the line 7—7, Fig. 5; and Fig. 8 is a rear elevational view of the modified form of the invention taken on an enlarged scale and with the upper part thereof broken away.

Referring now more in detail to the drawings, and having reference first to Figs. 1 to 4 thereof, the educational apparatus of my present invention comprises, in one of its more generic aspects, a base or plate A carrying sets of electrical contacts generally designated as B, which are adapted to be interconnected in the operation of the apparatus for completing an electric circuit between the questions and the corresponding answers, the said plate or base A being supported on a stand support C attached to the rear face of the plate A, the said stand support defining a battery casing for holding or supporting the battery for the electrical circuit means of the educational apparatus, the organization of these parts being such that a signal element D, which preferably comprises a lamp, may be mounted so as to be viewable from the front of said plate A and so as to extend from said plate into or to the casing stand support C for connection to the battery therein.

In the preferred embodiment of the invention, the base or plate A comprises an upright member made of sheet material such as paper board, supported in operative position as by being affixed, by means of nails 10, 10 to the stand support and battery casing C, the latter being made, for example, of wood, the construction being such that the plate A is stably supported in an upright position as clearly depicted in Figs. 1 and 2 of the drawings when in operative use, the manner of using the educational apparatus in such position being best indicated in Fig. 1 of the drawings.

In carrying out another of the objects of my present invention, the plate A is made to represent a part of the human figure ornamented to simulate a mystic, the said figure including a representation 11 of a head and representations 12 and 13 of the left and right hands respectively. The sets of electrical contacts B comprise two contact sets $b^1$ and $b^2$, the set $b^1$ being associated with the left hand representation 12 and the set $b^2$ being associated with the right hand representation 13.

Cooperating with the sets of contacts $b^1$ and $b^2$, there is provided the means carrying the educational data to be co-related, said means desirably comprising question and answer cards $12^a$ and $13^a$ shaped respectively to fit over said left and right hand representations 12 and 13, as clearly depicted in Fig. 1 of the drawings. These question and answer cards $12^a$ and $13^a$ are detachably attachable to the plate A by being received between the clips 14, 14 affixed to the plate A, the said clips mating with notched portions 15, 15 of the question and answer cards $12^a$ and $13^a$. These cards $12^a$ and $13^a$ are each provided with a plurality of apertures 16, 16 which register with the sets of contacts $b^1$ and $b^2$; and adjacent each aperture is placed the informational data which is to be co-related in the operation of the device. Thus, as illustrated in Fig. 1 of the drawings, the question card $12^a$ has adjacent one of its apertures the question "What is the diameter of the sun?" while the answer card $13^a$ has adjacent one of its apertures the co-related answer "864,000 miles." It will be understood that the question and answer cards $12^a$ and $13^a$ comprise a mating set and that a plurality of sets of such cards may be provided for each educational apparatus.

The supporting stand C may, if desired, comprise a simple block of wood suitably bored to receive the battery; and in the construction shown, this casing stand comprises a receptacle 17 having a slidable closure or top 18 for closing the top opening through which is inserted a battery 19, a leaf spring 20 being provided in said casing for resiliently engaging on terminal or pole of the battery and for urging the same into engagement with the signal element or lamp D. Fitted into the front wall 21 of the casing stand C, I provide a screw socket 22 which receives the lamp D the said lamp D being insertable into said socket from and through the front of the plate A, the arrangement being such that the lamp when received by the socket, is moved into direct connection with the mid-pole of the battery 19. Preferably also, the said lamp D is located so as to be positioned below the head 11 and between the hand representations 12 and 13 of the mystic figure, said lamp being desirably associated with an appropriate dress portion of the figure as clearly shown in Fig. 1 of the drawings.

The sets of contacts $b^1$ and $b^2$ are interconnected by electrical circuit means so that each contact of the set $b^1$ is connected to a given or predetermined contact of the set $b^2$. The manner of interconnecting these contacts is diagrammatically illustrated in Fig. 1 of the drawings and shown more in detail in Figs. 2 to 4 thereof. In the preferred form of the invention, the contact elements comprise eyelet members 23, 23 affixed to the paper board plate A, said eyelet members forming electrical sockets. These eyelet members are connected together in pairs on the rear face of the plate A by means of wires or conductors 24, 24, the said conductors being coiled at their ends and secured to the rear flanges of the eyelet members and being attached intermediate their ends to the rear face of the plate A in any desired way as by the gummed strips 25. Manifestly, other methods of interconnecting the eyelet sockets in pairs may be used; and desirably the wiring is concealed from view by being covered with a plaque or card 26 secured between the rear face of the plate A and the casing support C. Common to all of the circuits, and for selective operation of the contacts, there are provided the leads or conductors 28 and 29 connected respectively to the leaf spring 20 and lamp socket 22 and provided at their ends with the contact terminals 30 and 31 respectively, these contact terminals being peg shaped to be received by and fit into the socket defining eyelet elements 23, 23. The covering card 26 may, if desired, be apertured as at 32 in registry with the sockets to permit a full insertion of the peg terminals 30 and 31 into the sockets, as is fully illustrated in Figs. 1 and 3 of the drawings.

The use or operation of the educational apparatus shown in these Figs. 1 to 4 of the drawings, and the many advantages of the construction thereof, will in the main be fully apparent from the above detailed description thereof. In use, the apparatus is set up as shown in Figs. 1 and 2 of the drawings; and after a pair of question and answer cards $12^a$ and $13^a$ is fitted over the hand representations 12 and 13, the conductors 29 and 30 are manipulated to co-relate any selected question on the question card $12^a$ with the answer corresponding thereto to be found on trial on the card $13^a$. When the correspondence is produced, as when the conductor 28 is moved from the full to the dotted line position shown in Fig. 1 of the drawings, the electrical circuit for the contact pair is closed, this being indicated by the lighting of the signal element or lamp D. The association of the plate A with the battery casing C, the latter forming the supporting stand for the apparatus and housing or holding the battery to which the lamp D may be directly connected, results in a construction which considerably simplifies the interrelation between the mechanical and electrical parts and which therefore permits the apparatus to be manufactured and sold at a low figure. This arrangement moreover produces a mechanical design in which only the contact elements and the signal device are exposed to view, the remainder of the apparatus being hidden from view, the arrangement being such that the mystery of operation of the apparatus to the uninitiated is enhanced. The configuration and design of the plate A simulating a mystical figure further aids in producing a highly attractive and novel form of educational apparatus.

In Figs. 5 to 8 of the drawings, I show a modification of the construction of my invention in which the predetermined relation between the set of question contacts and the set of answer contacts may be varied or changed. Where the question and answer contacts are inter-related in a fixed way, the user soon learns the correspondence between the pairs of contacts and the acquisition of this knowledge detracts from the mystery or play element of the device. In the modified form of my invention, as shown in these Figs. 5 to 8 of the drawings, I therefore provide means for changing the relative positions between the question and answer contacts, thus making the operation of the apparatus more difficult to solve and adapting the same more flexibly to a variety of sets of question and answer cards.

This result I may accomplish in a number of ways and preferably by providing a stationary contact set $b^3$ and a movable contact set $b^4$, the contact set $b^3$ comprising eyelet elements affixed to the base A' and arranged over the right hand representation $13^1$ thereof and the contact set $b^4$ comprising eyelet members affixed to a disk 32 which is rotatably mounted on the plate A' by means of a spindle element 33, the left hand representation $12^1$ of the plate A' being provided with a plurality of orifices 34, 34 fixed in position and which are arranged so as to register with the socket eyelet elements of the contact set $b^4$. Associated with the left hand and right hand representations $12^1$ and $13^1$ there are provided the question and answer cards 35 and 36 best shown in Fig. 6 of the drawings, these question and answer cards being suitably apertured to register with the contact sets.

The rotor contact set 32 may be moved into any one of a number of positions as, for example, into any one of the three positions indicated by the registry of the colored sections 37, 37 (three in number) with the notch 38 of the hand representation $12^1$, the rotor 32 being fixed in any one of these three positions by means of a peg 39 mounted on the hand representation $12^1$ and received by anyone of the three orifices 40, 40 provided in the disk rotor 32. It will be noted that the contact elements of the contact set $b^4$ as well as the apertures 34, are arranged in concentric circles so as to permit the desired registration between the contact elements and the apertures in any of the plurality of positions of the rotor.

The remaining parts of the apparatus shown in Figs. 5 to 8 of the drawings are substantially the same as those already described for the form of the invention shown in Figs. 1 to 4 of the drawings and are designated by similar and primed reference characters except for the wiring system which is best shown in Figs. 7 and 8 of the drawings, and comprises conductors 41, 41 interconnecting the sets of contacts $b^3$ and $b^4$ in a manner to permit the relative motion between these contact sets, parts of the conductors being bound together by a conduit 42.

While I have shown and described my invention in the preferred forms, many changes and modifications may be made in the structure disclosed without departing from the spirit of the invention, defined in the following claims.

What I claim is:

1. An educational apparatus comprising a plate having over its single front face two sets of electrical contacts, a unitary question card applicable to one set of contacts, a unitary answer card applicable to the other set of contacts, a stand support for said plate attached to the lower rear face thereof, a battery of the flash-light type housed by said stand support, electrical circuit means interconnecting the contacts in said two sets of contacts and including contact terminals adapted to be selectively contacted with said sets of contacts for completing an electric circuit between the questions and the corresponding answers associated therewith, and a signal lamp for said circuit means mounted over the front of said plate and extending therethrough and into direct engagement with said battery.

2. An educational apparatus comprising a plate having thereon representations of right and left hands, a set of electrical contacts for the left hand representation, a second set of electrical contacts for the right hand representation, question and answer cards shaped to fit over the said right and left hand representations, and electrical circuit means interconnecting said right and left hand sets of contacts, said circuit means including a signal element and a pair of contact terminals adapted to be selectively contacted with said sets of contacts.

3. An educational apparatus comprising a plate having thereon a representation of the upper part of a human figure including right and left hands, a set of electrical contacts for the left hand representation, a second set of electrical contacts for the right hand representation, question and answer cards shaped to fit over the said right and left hand representations, and electrical circuit means interconnecting said right and left hand sets of contacts, said circuit means including a signal lamp and a pair of contact terminals adapted to be selectively contacted with said sets of contacts, said signal lamp being disposed between the left and right hand representations.

4. An educational apparatus comprising a plate having thereon a representation of a human figure simulating a mystic and including right and left hands, a set of electrical contacts for the left hand representation, a second set of electrical contacts for the right hand representation, printed matter setting forth questions and answers associated with the contacts of said right and left hand representations, and electrical circuit means interconnecting said right and left hand sets of contacts, said circuit means including a signal lamp and a pair of contact terminals adapted to be selectively contacted with said sets of contacts, said signal lamp being disposed below the face of said mystic representation and between the right and left hand representations in simulation of a jewel worn by the mystic.

5. An educational apparatus comprising a plate having on its front face a representation of a human figure including right and left hands, a set of electrical contacts for the left hand representation, a second set of electrical contacts for the right hand representation, question and answer cards shaped to fit over the said right and left hand representations, a stand support for said plate attached to the rear face thereof, said stand support defining a battery casing, and electrical circuit means interconnecting said right and left hand sets of contacts, said circuit means including a signal element and a pair of contact terminals adapted to be selectively placed over said sets of contacts, said signal element extending through said plate and into said casing support for connection to the battery therein.

6. An educational apparatus comprising a base, a plurality of sets of electrical contacts, one set being associated with printed matter and thereby indicating questions and another set being associated with printed matter and thereby indicating answers, at least one set being bodily movable as a unit relative to the printed matter associated therewith, electrical circuit means interconnecting said sets of contacts and including contact terminals adapted to coact with said sets of contacts for completing an electric circuit between the indicated questions and answers, the set of question indicating contacts being connected to the set of answer indicating contacts in a predetermined relationship, and movement of the movable set of contacts varying said predetermined connection relationship between the entire set of question indicating contacts and the entire set of answer indicating contacts.

7. An educational apparatus comprising a base, a plurality of sets of electrical contacts, one set being associated with printed matter and thereby indicating questions and another set being associated with printed matter and thereby indicating answers, at least one set being bodily movable as a unit relative to the printed matter associated therewith, multiple electrical circuit means interconnecting pairs of contacts in said sets of contacts, a single electrical circuit means including at its terminals contact means adapted to coact selectively with said sets of contacts for completing an electric circuit between the indicated questions and answers, the connected pairs of question indicating and answer indicating contacts having predetermined relative positions, and movement of the movable set of contacts changing the relative positions of the connected pairs of the set of question indicating contacts and the set of answer indicating contacts.

8. An educational apparatus comprising a base, a plurality of sets of electrical contacts, one set being fixed to said base and the other set being movable with respect to said base, electrical circuit means interconnecting said sets of contacts and including contact terminals adapted to coact selectively with said sets of contacts for completing an electric circuit between the pairs of contacts, and question and answer cards properly associated with said sets of contacts to relate the questions with respective answers on said cards, movement of said movable contact set being effective for changing the relative positions of the connected ones of the question and answer contacts.

Signed at New York city, in the county of New York and State of New York, this 1st day of May, A. D. 1928.

LOUIS MARX.